United States Patent Office 3,225,013
Patented Dec. 21, 1965

3,225,013
CURABLE COMPOSITIONS OF AN ORGANIC ACID ANHYDRIDE AND AN ALKYLENIMINE DERIVATIVE
Paul Fram, Lincoln Township, Washington County, Minn., assignor to Minnesota Mining and Manufacturing Company, St. Paul, Minn., a corporation of Delaware
No Drawing. Continuation of application Ser. No. 59,833, Oct. 3, 1960. This application Oct. 12, 1964, Ser. No. 403,331
16 Claims. (Cl. 260—78)

This application is a continuation of U.S. Serial No. 59,833, filed October 3, 1960, now abandoned.

This invention relates to a novel, essentially anhydrous composition which can be cured to form useful copolymers. In one aspect this invention relates to a liquid composition which can be cured by heating. In still another aspect this invention refers to laminates of and fabrics impregnated with these curable resins.

Reinforced plastic laminates which can withstand exposure to higher temperatures are desired in such applications as radar domes for high speed aircraft, missile casings and jet engine compressor blades. Epoxy type resins exhibit certain attractive properties for such applications, e.g. low shrinkage during polymerization, good mechanical, electrical and chemical resistance, good fatigue and erosion resistance, low moisture absorption, excellent bonding to diverse materials and dimensional stability. Unfortunately many conventional epoxy resins have the disadvantage of low heat distortion points.

It is, therefore, an object of this invention to provide liquid compositions which can be cured to resins having advantages over epoxy resin systems.

Another object of this invention is to provide essentially anhydrous, thermally curable compositions.

Still another object of this invention is to provide stable liquid one-part compositions which can be cured without added activators.

A further object of this invention is to provide a new and useful adhesive and laminating resin as well as a casting resin.

Yet another object of this invention is to provide a method for preparing the aforesaid curable compositions and the cured products thereof.

The liquid, thermally curable and stable compositions of this invention comprise an essentially anhydrous admixture of an organic acid anhydride and an alkylenimine derivative of the formula

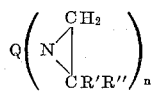

where Q is a n-valent radical, $n$ is at least 2 (preferably 2 or 3), N is preferably linked to an atom having a valence of 4 or 5 (most preferably C or P), and R' and R'' are hydrogen or an alkyl group which is preferably a lower alkyl group having from 1 to 8, preferably from 1 to 4, carbon atoms. The bracketed radical is also referred to as an azirane ring or aziridinyl radical. Q may be an aliphatic, aromatic or alicyclic organic radical which does not contain an active hydrogen (except as may hereinafter be expressly recited) but which may contain atoms other than carbon, such as oxygen, sulfur, nitrogen, etc. Q may also be an inorganic radical, such as

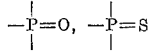

or the organic radical

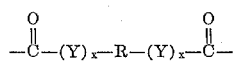

wherein Y is either —O— or —NH—, $x$ is either 0 or 1, and R is a divalent aliphatic, aromatic or alicyclic radical which may contain atoms other than carbon, e.g. oxygen, sulfur, etc. The term "active hydrogen" used herein is defined in terms of the well known Tschugaeff-Zerewitinoff analytical technique, e.g. note J.A.C.S., 49, 2181 (1927).

The phosphorus containing alkylenimine derivatives may contain one or more phosphorus atoms. The preferred compounds have a single phosphorus atom and are represented by the formula

where X is either oxygen or sulfur, and $A_1$, $A_2$ and $A_3$ are selected from the group consisting of an azirane ring (as above defined), a monovalent aliphatic, a monovalent aromatic, and a monovalent alicyclic organic radical, at least two of said A radicals containing an azirane ring.

Among the alkylenimine derivatives containing three reactive azirane rings are the N,N',N''-tris-alkylene trimesamides, particularly the tris-1-alkyl-1,2-ethylene trimesamides. Examples of this class include: N,N',N''-tris-ethylene trimesamide; N,N',N''-tris-2-methylethylene trimesamide; N,N',N''-tris-2-ethylethylene trimesamide; N,N',N''-tris-2-propylethylene trimesamide; N,N',N''-tris - 2 - butylethylene trimesamide; N,N',N''-tris-2-isopropylethylene trimesamide; N,N',N''-tris-2,2-dimethylethylene trimesamide; N,N',N''-tris-2-methyl - 2 - ethylethylene trimesamide; N,N',N''-tris-2,2-dipropylethylene trimesamide; etc. These compounds are prepared in a manner similar to the bis-1,2-alkylenamides, described later.

The phosphorus containing alkylenimine derivatives contain at least two aziridine rings and include, for example, tris(1-aziridinyl) phosphine oxide; tris(1-aziridinyl) phosphine sulfide; N,N-diethyl-N',N''-diethylenethiophosphoramide; N,N'-diethylenbenzene thiophosphondiamide; N-(3-oxapentamethylene) - N',N'' - diethylene phosphoric triamide; N,N'-diethylene benzene phosphondiamide; N,N'-diethylene ethane phosphondiamide; butyl N,N' - diethylenediamidophosphate; N,N-dioctyl-N',N''-diethylenephosphoric triamide; N,N',N'' - tris(1,1 - dimethylethylene)phosphoric triamide, etc.

The carbonyl containing alkylenimine derivatives which are particularly preferred have the formula

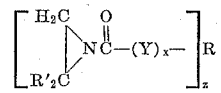

including

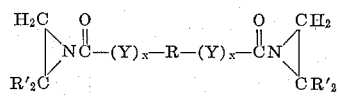

wherein Y is either oxygen or —NH—, $z$ is 2 or 3, $x$ is either 0 or 1, R' is hydrogen or a lower alkyl group (i.e. a hydrocarbon radical having from 1 to 4 carbon atoms), and R is a z-valent aliphatic, aromatic or alicyclic radical. R may contain atoms other than carbon, such as oxygen and sulfur, but does not contain an active hydrogen, i.e. a hydrogen which is active to the Zerewitinoff test (inert to Grignard reagents). When $x$ is 0, the compound is a bis-1,2-alkylenamide. When Y is oxygen and $x$ is 1, the compound is a bis-1,2-alkylene carbamate. When Y is —NH— and $x$ is 1, the compound is a bis-1,2-alkylene urea, such as 1,6-hexamethylene N,N'-diethylene urea.

Bis-1,2-alkylene carbamates and their preparation are described in U.S. Serial No. 850,541, filed November 3, 1959 now U.S. 3,162,617. Generally, their preparation involves the reaction of a 1,2-alkylenimine in a water phase with a solution of a chlorocarbonate of a difunctional alcohol in a water immiscible organic solvent, in the presence of an acid acceptor, at a temperature between about −5° C. and 30° C. The following Example A illustrates the preparation.

*Example A*

A 250 ml. three necked flask was equipped with a stirrer, thermometer, condenser and dropping funnel. To the flask was added a solution of 41.5 grams (0.3 mol) of potassium carbonate in 50 ml. of water, followed by 9.0 grams (0.21 mol) of ethylenimine. This mixture was stirred and cooled to 10° C. A solution composed of 27.5 grams (0.1 mol) of triethylene glycol bis chlorocarbonate in 100 ml. of benzene was then added dropwise to the flask with stirring and cooling over a period of about 18 minutes. The mixture was kept at 10–12° C. during the addition and was allowed to warm to room temperature after the addition had been completed. Stirring was continued for an additional hour. The benzene layer was recovered, dried over a molecular sieve, filtered and evaporated to constant weight under vacuum. 28 grams of a water-white liquid product (which was identified N,N'-bis-1,2-ethylene (triethylene glycol) carbamate) were obtained, corresponding to a 99% yield thereof. The refractive index ($n_D^{25}$) of this product was 1.4748 and its density ($d_4^{22°}$) was 1.198. Upon analysis, this product was found to contain 9.74% of nitrogen and 0.1% chlorine as compared to calculated values of 9.73% and 0.0% respectively. It is also soluble in a 1:1 weight ratio with water, methanol, isopropanol, methyl ethyl ketone, ethyl cellosolve, butyl acetate and toluene.

Illustrative of the bis-carbamates which are useful onepart systems of the present invention are:

N,N'-bis-1,2-ethylene (1,4-butanediol) carbamate;
N,N'-bis-1,2-propylene (1,4-butanediol) carbamate;
N,N'-bis-1,2-butylene (1,4-butanediol) carbamate;
N,N'-bis-1,2-ethylene (diethylene glycol) carbamate;
N,N'-bis-1,2-butylene (diethylene glycol) carbamate;
N,N'-bis-1,2-ethylene (triethylene glycol) carbamate;
N,N'-bis-1,2-propylene (triethylene glycol) carbamate;
N,N'-bis-1,2-butylene (triethylene glycol) carbamate;
N,N'-bis-1,2-ethylene (polyethylene glycol-200) carbamate;
N,N'-bis-1,2-propylene (polyethylene glycol-1000) carbamate;
N,N'-bis-1,2-ethylene (polyethylene glycol-4000) carbamate;
N,N'-bis-1,2-propylene (polyethylene glycol-1000) carbamate;
N,N'-bis-1,2-ethylene (polyethylene glycol-4000) carbamate;
N,N'-bis-1,2-ethylene (polypropylene glycol-1025) carbamate;
N,N'-bis-1,2-ethylene (polybutylene glycol-500) carbamate;
N,N'-bis-1,2-ethylene [1,1'-isopropylidenebis (p-cyclohexanol)] carbamate;
N,N'-bis-1,2-ethylene [1,1'-isopropylidenebis (p-phenyleneoxy) di-2-propanol] carbamate;
N,N'-bis-1,2-ethylene phenylenoxydiocetamide;
N,N'-bis-1,2-ethylene phenylenoxy carbamate;
N,N'-bis-1,2-ethylene-4,4'-bisphenyl carbamate;
N,N'-bis-1,2-ethylene (1,1'-isopropylidene-bis-phenylene) carbamate;
N,N'-bis-ethylene-resorcinol carbamate, etc.

The preferred aromatic carbamates are represented by the above formula wherein R is 1,3-phenylene, 1,4-phenylene, 1,1'-isopropylidene-bis-phenylene, or 1,1'-isopropylidene bis (p-phenylenoxy) di-2-propanol. The preferred aliphatic carbamates are represented by the above formula wherein R is a branched or straight chain alkylene radical having from about 4 to about 40, preferably from about 4 to about 20, carbon atoms.

Bis-1,2-alkylenamides and their preparation are described in U.S. Serial No. 832,152 (filed August 7, 1959), now U.S. 3,115,474; Serial No. 840,255 (filed September 16, 1959), now U.S. 3,115,482; and Serial No. 850,330 (filed November 2, 1959), now U.S. 3,115,490. Generally, their preparation involves the reaction of an alkylenimine in an aqueous phase with a solution of a dicarboxylic acid halide in a water immiscible organic solvent in the presence of an acid acceptor at a temperature between about −5° C. and 30° C. Illustrative of the N,N'-bis-1,2-alkylenamides in accordance with this invention are N,N'-bis-1,2-ethylenadipamide;
N,N'-bis-ethylenpentadecyladipamide;
N,N'-bis-1,2-butylenadipamide;
N,N'-bis-1,2-ethylenepimelamide;
N,N'-bis-ethylene thipdipropionamide;
N,N'-bis-ethylene oxydipropionamide;
N,N'-bis-1,2-ethylenisosebacamide;
N,N'-bis-1,2-butylenisosebacamide;
N,N'-bis-1,2-ethylensebacamide;
N,N'-bis-1,2-ethylensuberamide;
N,N'-bis-1,2-propylensuberamide;
N,N'-bis-1,2-butylensuberamide;
N,N'-bis-1,2-ethylenazelaamide;
N,N'-bis-1,2-propylenazelaamide;
N,N'-bis-1,2-butylenazelaamide;
N,N'-bis-1,2-ethylendodecanoyldicarboxylic acid amide;
N,N'-bis-1,2-ethylentetradecanoyldicarboxylic acid amide;
N,N'-bis-1,2-propylentetradecanoyldicarboxylic acid amide;
N,N'-bis-1,2-ethylenhexadecanoyldicarboxylic acid amide;
N,N'-bis-1,2-ethylenoctadecanoyldicarboxylic acid amide;
N,N'-bis-1,2-propylenoctadecanoyldicarboxylic acid amide;
N,N'-bis-1,2-propylendodecanoyldicarboxylic acid amide;
N,N'-bis-1,2-pentylensebacamide;
N,N'-bis-1,2-ethylene monadecanediamide;
N,N'-bis-1,2-ethylene-1,4-naphthalenedicarboxamide;
N,N'-bis-1,2-propylene-1,4-naphthalenedicarboxamide;
N,N'-bis-1,2-ethylene-4,4'-bis-phenyl dicarboxamide;
N,N'-bis-1,2-propylene-4,4'-bisphenyl dicarboxamide;
N,N'-bis-1,2-ethylene hexahydroterephthalamide;
para-(N-1,2-ethylene carboxamidophenyl)-N-1,2-ethylene acetamide;
N,N'-bis-1,2-ethylene isophthalamide;
N,N'-bis-1,1-dimethylethylene isophthalamide;
N,N'-bis-1,2-butylene isophthalamide;
N,N'-bis-1,2-ethylene hexahydroisothalamide; etc.

The preferred aliphatic bis-1,2-alkylenamides are represented by the above formula wherein R is a branched or straight chain alkylene radical having from about 4 to about 40, preferably from about 2 to about 20, carbon atoms. The preferred aromatic bis-1,2-alkylenamides are represented by the above formula wherein R is 1,3-phenylene, 1,4-phenylene, 1,4-naphthalene, or 4,4'-bis-phenyl. The following Example B illustrates the preparation.

*Example B*

N,N'-bis-ethylene isosebacamide is prepared by the reaction of ethylenimine with isosebacoyl dichloride to produce the desired substantially pure monomer, with hydrogen chloride as a by-product. Specifically, it may be prepared as follows: A solution of about 95.6 parts of isosebacoyl dichloride prepared from isosebacic acid dissolved in 400 parts of diethyl ether is added dropwise with cooling and vigorous stirring to a flask containing a solution of 110 parts of potassium carbonate and 43 parts of ethylenimine in 800 parts of water. The temperature of the mixture is maintained below 15° C. and the acid chloride is added at a rate of approximately 1 part per minute. The reaction mixture is allowed to warm gradually to room temperature, while stirring, for an additional hour. During the total reaction period, the pH of the reaction mixture has dropped from approximately 12.5 at the beginning of the reaction to about 8.6 at the end. The ether layer is separated, dried over solid anhydrous sodium hydroxide at 0° C. for 1 hour, the sodium hydroxide is removed by filtration and the ether removed from the filtrate under reduced pressure. The resulting reaction product, N,N'-bis-1,2-ethylenisosebacamide, remains as a water-white liquid.

The acid anhydrides which are employed as one component in the liquid curable composition of this invention are preferably compatible with the alkylenimine derivative with which they are admixed. However, various organic solvents, such as ethyl Cellosolve, methyl ethyl ketone, butyl acetate, etc. can be incorporated into the liquid composition either to improve compatibility or for application purposes, as will later be described. The preferred acid anhydrides are those which yield at least a dibasic organic acid upon hydrolysis. Illustrative of suitable anhydrides are maleic, chloromaleic, methyl maleic, succinic, methyl succinic, dodecenyl succinic, octyl succinic, methylene succinic (itaconic), nadic, methyl nadic, chlorendic, tricarballylic, trimellitic, pyromellitic, phthalic, tetrahydrophthalic, tetrabromophthalic, tetrachlorophthalic, etc.

Since the acid anhydrides which are employed as one component in the curable composition of this invention must be compatible with the alkylenimine derivative, it is therefore essential that the admixture of alkylenimine derivative and acid anhydride be homogeneous at the elevated cure temperature or reaction temperature, though not necessarily at room temperature. As later described, a cure temperature is selected which is preferably below the volatilization temperature of the most volatile reactive constituent, although higher cure temperatures may be employed, e.g. when an excess amount of the more volatile constituent is provided. When organic solvents, such as ethyl Cellosolve, methyl ethyl ketone, butyl acetate, etc., can be incorporated into the liquid curable admixture to improve compatability or for certain other purposes, as mentioned earlier, such solvent can be volatilized off during the elevated temperature cure. In all cases, however, the composition must be essentially homogeneous at the cure temperature for the production of the desired copolymer, and a non-homogeneous admixture leads chiefly to the undesirable production of the homopolymer of the alkylenimine derivative.

Since both the alkylenimine derivatives and acid anhydrides are sensitive to moisture and frequently to hydroxyl compounds and to active hydrogen, it is important that the respective ingredients, as well as the final curable admixture, be essentially anhydrous to provide optimum shelf life and to prevent a premature cure. The cure time may vary from a few seconds to 5 days and longer and is dependent on such factors as cure temperature, reactivity of reactants, etc. Although stoichiometric amounts of the anhydride and the bifunctional alkylenimine derivative may be employed, 30 to 50% excess or more of the alkylenimine derivative is usually used.

In preparing the curable compositions of this invention the desired quantities of anhydrous alkylenimine derivatives and acid anhydrides are thoroughly admixed at room temperature, producing a homogeneous admixture or an intimate dispersion. In addition to the reactive ingredients mentioned above, other elastomers, synthetic and natural resins, fillers (e.g. silica, carbon black, powdered metals, etc.), plasticizers and coloring agents may be included in the composition, depending on the ultimate properties desired in the cured product. Epoxy resins, for example, generally improve the water resistance of the cured product. The properties can be varied considerably by utilizing one or more of the reactants in combination or by appropriate selection of other additives. It should be understood that the homogeneous admixture mentioned earlier refers to a homogeneous admixture of reactive ingredients and does not necessarily include additives, which may be dispersed therein.

The liquid compositions of this invention are essentially anhydrous and stable at ordinary room temperature and are cured by heating to elevated temperatures, the temperature being selected to provide optimum cure properties and to regulate the cure rate, usually from about 40° C. to about 200° C. with curing times usually ranging from about 1 minute to about 24 hours or more.

Such liquid compositions are particularly useful when applied to various surfaces as impregnating agents and laminating agents. They may be applied to various fabrics, such as glass cloth, leather, duck and tarpaulin fabric, etc. to improve wear and abrasion properties, water repellency and resistance to thermal and chemical attack. They may also be used to laminate such materials as glass sheets, glass cloth, metal surfaces (e.g. aluminum, steel, etc.), wood surfaces and many others. The adhesion properties of these hard resins are particularly good.

The degree of brittleness or flexibility of the cured system can be controlled within limits by appropriate selection of the anhydride or anhydrides and/or the alkylenimine derivative or derivatives. Use of various solubilizable anhydride polymers, such as the toluene soluble elastomeric copolymer of rubber and maleic anhydride, imparts specific properties to the cured product. Other elastomers can be converted to soluble anhydride rubbers and subsequently reacted with alkylenimine derivatives in similar manner. The preparation of such soluble anhydride elastomers is illustrated in the literature, see Rubber and Chem. Tech., vol. 19, p. 319 (1946) and vol. 20, p. 938 (1947). Liquid compatible polymers containing anhydride groups or solid anhydride polymers which can be dissolved in a mutual solvent with the alkylenimine derivative are suitable acid anhydrides within the scope of this invention.

The cured products thereby produced are copolymers which comprise repeating monomeric units corresponding to the anhydride, e.g.

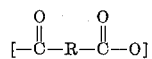

and the alkylenamine derivative, e.g.

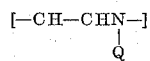

The copolymer product is different from that obtained by reacting the alkylenimine derivative with an organic carboxylic acid (rather than the anhydrides used herein) or by reacting the alkylenimine derivative with an anhydride in the presence of water.

*Example 1*

The following anhydrous ingredients were blended at room temperature:

Blend of— Grams
    1320 gm. Hycar 1001 [1] _____ 2
    440 gm. polyester resin (55/45 terephthalic acid/isophthalic acid condensed with ethylene glycol)
    308 gm. P,P'-oxybis (benzenesulfonyl hydrazide)
    100 gm. carbon black
    17 gm. dicumyl peroxide
    17 gm. Neozone D rubber antioxidant
Pyromellitic dianhydride _____ 0.9
N,N'-bis-ethylene isosebacamide _____ 2.0

[1] Butadiene-acrylonitrile rubber, sp. gr. 1.00, Mooney viscosity range 85–115, contains octylated diphenylamines as antioxidant.

The admixture was heated under an infra-red lamp to produce a somewhat brittle foamed plastic which displayed excellent adhesion to aluminum.

Example 2

108 parts by weight of N,N'-bis-ethylene sebacamide was melted and admixed with 54.4 parts by weight (1/1 equivalent ratio) of pyromellitic dianhydride and the admixture was spread onto glass cloth, from which a 12-ply 5 inch by 5 inch laminate was prepared. The laminate was cured for 20 minutes at 310° F. (25 p.s.i.) in a heated hydraulic press and then cured for 14 hours at 350° F. in an oven. The cured glass cloth laminate displayed good adhesion properties and was resistant to delamination.

Example 3

To illustrate the use of these liquid compositions as casting resins, the following three anhydrous specimens were admixed and cured in aluminum dishes (cure sequency—16 hours at 60° C., 4 hours at 80° C., 12 hours at 120° C. and 16 hours at 177° C.).

| Specimen | Parts by weight | | |
|---|---|---|---|
| | A | B | C |
| Chlorendic anhydride | 98 | 98 | 114 |
| N,N'-bis-ethylene isosebacamide | 100 | | |
| N,N'-bis-ethylene sebacamide | | 100 | |
| N,N'-bis-ethylene isophthalamide | | | 100 |

All three specimens were gelled after 16 hours at 60° C. The cured copolymers of specimens A and B were reddish in color, and the cured copolymer of C was gray.

Example 4

The following anhydrous specimens were admixed and cured in aluminum dishes (16 hours at 60° C., 4 hours at 80° C., 16 hours at 120° C., and 16 hours at 177° C.).

| Specimen | Parts by weight | | |
|---|---|---|---|
| | A | B | C |
| Methyl nadic anhydride | 47 | 47 | 55 |
| N,N'-bis-ethylene isosebacamide | 100 | | |
| N,N'-bis-ethylene sebacamide | | 100 | |
| N,N'-bis-ethylene isophthalamide | | | 100 |

All three specimens gelled after 16 hours at 60° C., were reddish in color, and changed to black in the 120° C. oven. Physical data on the cured copolymers were as follows:

| Specimen | Rockwell Hardness | Heat Penetration, ° C. |
|---|---|---|
| A | M-54 | 50 |
| B | R-91 | 60 |
| C | Brittle | 205 |

Example 5

The following specimens were admixed and cured in aluminum dishes (16 hours at 60° C., 4 hours at 80° C., 16 hours at 120° C., 16 hours at 350° F.).

| Specimen | Parts by weight | | |
|---|---|---|---|
| | A | B | C |
| Pyromellitic dianhydride | 29 | 29 | 33.5 |
| N,N'-bis-ethylene isosebacamide | 100 | | |
| N,N'-bis-ethylene sebacamide | | 100 | |
| N,N'-bis-ethylene isophthalamide | | | 100 |

Specimens A and B were black in color. Specimen C was green colored. Specimens A and C were hard resinous copolymers after 16 hours at 60° C.

Similar results can be obtained by admixing other alkylenimine derivatives described earlier and other anhydrides set forth earlier, and curing the anhydrous admixture at elevated temperatures, the conditions and temperatures being selected to provide a homogeneous admixture at the cure temperature.

The anhydrous stable compositions of this invention can also be cured in the presence of moisture either at room temperature or at slightly elevated temperatures to provide a hard resinous polymer with an unusual combination of properties, including prolonged shelf life, long pot life at elevated temperatures, and excellent bonding or adhesive characteristics. In such cases, the admixture should be homogeneous at room temperature. When these compositions are used as adhesives and cements they may be applied directly to the appropriate surfaces and cured by contact with water. Since water serves as activating agent, the surfaces may be wetted prior to application of the adhesive or cement. In fact, it is one of the advantages of these compositions that the surfaces to be bonded or laminated need not be dry, this being an outstanding property when such compositions are used as dental cements or filling compounds. Contact with moist air will also effect a cure, though at a relatively slow rate. In certain instances the water of activation can be incorporated into the composition in the form of a hydrate which loses water at temperatures above room temperature. Illustrative of such a hydrate is sodium borate decahydrate, which loses water at elevated temperatures of about 168° F. Particularly when laminating low heat conductive materials, e.g. wood, the heat liberated by the exothermic reaction is sufficient to liberate water of hydration from the added hydrate and thereby to make the curing reaction self-propagating. In the more usual application however, the anhydride and alkylenimine derivatives are admixed with an approximate stoichiometric amount of water immediately prior to use. This amount of water used may vary widely from the preferred approximate stoichiometric amount required to convert the anhydride to the corresponding acid, e.g. as low as about 20% of the stoichiometric amount, but excess water, e.g. more than 50% excess over the stoichiometric amount, is usually unnecessary. Any exothermic reaction, of course, may result in the loss of water and appropriate compensation may be made for this loss. With the lesser amounts of water, the rate of reaction is correspondingly lower, and the ultimate cure may be limited by the available moisture in the environment.

The copolymers produced by curing the stable anhydrous admixtures of this invention in the presence of water are distinct from those produced by heating the anhydrous mixture to an elevated temperature without water contact. The mechanism appears to involve the hydrolysis of the acid anhydride to the corresponding acid and the reaction of this acid with the alkylenimine derivative by opening the azirane ring and addition of the active hydrogen from the carboxyl group to the nitrogen atom. These water cured products provide a one-part adhesive composition which can readily be cured with negligible shrinkage to form a tough, water-resistant bond between various materials such as wood (e.g. marine plywood), stone, synthetic resins and elastomers, bone, metals (e.g. aluminum, etc.), glass, synthetic and natural fibers, etc.

The following examples are presented for purposes of illustrating the curing in the presence of water and are not necessarily to be construed as limiting the scope of the invention. All cures are effected at room temperature unless otherwise indicated.

Example 6

Two grams of N,N'-bis-ethylene isosebacamide were mixed with one gram of pyromellitic dianhydride. Two pieces of plywood were soaked in water for several minutes and were coated with this mixture. An overlap bond of one square inch contact surface was clamped into position with a C-clamp. After ten minutes the specimen was tested on the Instron Tensile Test machine, and a force of 225 pounds per square inch was required to cause rupture. Failure resulted from complete delamination of plywood, the adhesive line remaining intact.

Following a similar procedure the following specimens were prepared and tested:

TABLE I

| Example No | 7 | 8 | 9 | 10 | 11 | 12 |
|---|---|---|---|---|---|---|
| Pyromellitic dianhydride | 3 | 2.5 | 2 | 4 | | |
| N,N'-bis-ethylene isosebacamide | 6 | 6.0 | 6 | 4 | 6 | 3 |
| Poly Bd-PMDA [1] | | 1.0 | 2 | | 1 | 1 |
| Chlorendic anhydride | | | | 6 | 7.5 | 3 |
| Tensile, p.s.i.: | | | | | | |
| Dry | 550 | 460 | 360 | 225 | 180 | 260 |
| Wet | 100 | 90 | | | 65 | 50 |
| Failure: | | | | | | |
| Dry | W | W | WA | A | A | A |
| Wet | A | A | A | A | A | A |

| Example No | 13 | 14 | 15 | 16 | 17 | 18 |
|---|---|---|---|---|---|---|
| Pyromellitic dianhydride | 2.5 | | 2.0 | 2.0 | | 3.0 |
| Poly Bd-chloro maleic [2] | 1.0 | 0.5 | | | | |
| N,N'-bis-ethylene isosebacamide | 6.0 | 3.0 | 6.0 | 4.0 | 12 | 6 |
| Chlorendic anhydride | | 3.75 | | | 15 | |
| Dodecyl succinic anhydride | | | 1.1 | 1.0 | 1.1 | 2.5 |
| N,N'-bis-ethylene sebacamide | | | | 2.0 | | 5.5 |
| Vinyl butyl ether-maleic anhydride [3] | | | | | 1.0 | |
| Bentone 34 [4] | | | | | 0.2 | |
| Cabosil [5] | | | | | 2.0 | |

| Example No | 13 | 14 | 15 | 16 | 17 | 18 |
|---|---|---|---|---|---|---|
| Na₂B₄O₇·10H₂O | | | | | | 3.0 |
| Tensile, p.s.i.: | | | | | | |
| Dry | 665 | 220 | 785 | 820 | 435 | 600 |
| Wet | 50 | 280 | 315 | 350 | 250 | 290 |
| Failure: | | | | | | |
| Dry | W | A | W | W | WA | W |
| Wet | A | W | WA | WA | WA | WA |

[1] Liquid copolymer of butadiene and styrene (85:15 mol ratio), +20 weight percent pyromellitic dianhydride.
[2] Liquid copolymer of butadiene and styrene (85:15 mol ratio), +20 weight percent chloromaleic anhydride.
[3] Rubbery polymer of vinyl normal butyl ether and maleic anhydide prepared by reacting 2 parts of ether and approximately 2 parts of anhydride in the presence of $CH_2Cl_2$ and azobisisobutyronitrile (18 hours at 50° C.).
[4] Bentone 34 is finely divided dimethyldiooctadecyl ammonium bentonite (National Lead Co.).
[5] Cabosil is colloidal silica prepared in a hot faseous environment by vapor-phase hydrolysis of a silicon compound (Godfrey L. Cabot, Inc.).
Failure: W=wood; A=adhesive.

The preparation of Example 18 illustrates a unique method for incorporating water of activation into the recipe. A hydrate, such as borax decahydrate, is milled into the system. At a temperature of about 168° F. sodium borate decahydrate loses eight molecules of water, which then activates the anhydride an it polymerization with the alkylenimine derivative. Such an adhesive, when placed in a dry wood glue line, can be activated by heating one point or edge of the glue line to a temperature above the dehydration temperature. With low heat conductive materials, such as wood, the highly exothermic reaction can be self-propagating through the glue line.

*Example 19*

A concrete block was coated with a composition having the following ingredients:

Parts by weight
N,N'-bisethylene isosebacamide _____ 4
N,N'-bis-ethylene sebacamide _____ 2
Pyromellitic dianhydride _____ 1
Dodecyl succinic anhydride _____ 1

The coated block was placed in water with the coated surface above the water line. After 24 days no detrimental effects on the coating were observed, and the coating could not be removed from the concrete surface.

To illustrate the cured systems of this invention with regard to both the rate and the extent of reaction representative runs are set forth in Table II. For purposes of comparison, the extent of reaction was assumed to be represented by the water sensitivity of the cured system. This was determined by hydrolyzing the cured system for 7 days at 180° F. and titrating the water phase, the resulting acid value indicating the amount of carboxyl groups freed during hydrolysis. However, the residue material also contained carboxy groups that were not water soluble. When this residue was placed into solution in alcohol, further titration indicated the amount of carboxy groups freed from the residue. The overall extent of reaction was calculated from the combined acid number of the water phase and the residue.

TABLE II

*Reaction product data of N,N'-bis-ethylene isosebacamide and anhydride*

| Ex. | Anhydride | Equivalent ratio of alkylenimine derivative/anhydride | Extent of reaction, percent | Reaction time (room temp.), days |
|---|---|---|---|---|
| 20 | Methyl maleic | 1/1 | 71.2 | 1–2 |
| 21 | Methyl maleic | 1.3/1 | 76.0 | 1–2 |
| 22 | Methyl succinic | 1.3/1 | 81.1 | 2–3 |
| 23 | C₈ alkyl succinic | 1.3/1 | 88.3 | 2–3 |
| 24 | C₁₂ alkyl succinic | 1/1 | 76.3 | >3 |
| 25 | C₁₂ alkyl succinic | 1.3/1 | 90.0 | >3 |
| 26 | Methyl nadic | 1.3/1 | 93.2 | 5 |
| 27 | Tetrahydrophthalic | 1/1 | | 2 |
| 28 | Benzoic | 1/1 | | 6 |

Other alkylenimine derivatives were also evaluated in terms of reaction time, i.e. time required for the formation of a tack-free cured product. Table III illustrates the reaction of tris-aziridyl phosphine oxide and various anhydrides.

TABLE III

Reaction product data of tris-aziridyl phosphine oxide and anhydride

| Ex. | Anhydride | Equivalent ratio of alkylenimine derivative/anhydride | Wt. percent H₂O (based on reactive ingredients) | Reaction Time (minutes) |
|---|---|---|---|---|
| 29 | Chloromaleic | 1/1 | 0 | 0.28 |
| 30 | Dodecenyl succinic | 0.75/1 | 0 | >10 |
| 31 | Maleic | 1/1 | 0 | >5 |
| 32 | Methyl nadic | 0.75/1 | 0 | >10 |
| 33 | Chloromaleic anhydride-pentaerythritol adduct | 1/1 | 0 | 1 |
| 34 | Chloromaleic | 1/1 | 10 | 0.11 |
| 35 | Chloromaleic | 1/1 | 24 | 0.09 |
| 36 | Dodecenyl succinic | 1/1 | 24 | (¹) |
| 37 | Maleic | 1/1 | 24 | 2.40 |
| 38 | Methyl nadic | 1/1 | 24 | (¹) |
| 39 | Methyl succinic | 1/1 | 24 | (¹) |
| 40 | Pyromellitic dianhydride | 1/1 | 24 | 0.55 |
| 41 | Trimellitic | 1/1 | 24 | 0.63 |
| 42 | Dimethyl butenyl tetrahydrophthallic | 1/1 | 10 | (²) |

[1] 3 hours.
[2] >4 hours.

Table IV illustrates the use of chloromaleic anhydride with various alkylenimines and mixtures thereof, including the use of added fillers such as titanium dioxide. All systems were evaluated on a basis of 1/1 ratio of reactive azirane ring equivalents to acid equivalents. Ratios in parentheses are by weight.

TABLE IV

Reaction product data of chloromaleic anhydride and alkylenimine derivative

| Ex. | Alkylenimine derivative | Reaction time, minutes |
|---|---|---|
| 43 | Tris-aziridyl phosphine oxide; N,N'-bis-ethylene isosebacamide (3:7). | 3.0 |
| 44 | Tris-aziridyl phosphine oxide | 1.0 |
| 45 | Tris-aziridyl phosphine oxide: N,N'-bis-ethylene isosebacamide (8:2). | 1.4 |
| 46 | Tris-aziridyl phosphine oxide: N,N'-bis-ethylene isosebacamide (6:4). | 2.0 |
| 47 | Tris-aziridyl phosphine oxide: N,N'-bis-ethylene isosebacamide (4:6). | 3.0 |
| 48 | Tris-aziridyl phosphine oxide: N,N'-bis-ethylene isosebacamide (2:8). | 4.0 |
| 49 | N,N'-bis-ethylene isosebacamide | 20.0 |
| 50 | Tris-aziridyl phosphine oxide: N,N'-bis-ethylene sebacamide (8:2). | 1.8 |
| 51 | Tris-aziridyl phosphine oxide: N,N'-bis-ethylene sebacamide (6:4). | 2.5 |
| 52 | Tris-aziridyl phosphine oxide: N,N'-bis-ethylene sebacamide (4:6). | 3.0 |
| 53 | Tris-aziridyl phosphine oxide: titanium dioxide (5:5). | 0.8 |
| 54 | Tris-aziridyl phosphine oxide: N,N'-bis-ethylene isosebacamide: titanium dioxide (4:1:5). | 1.5 |
| 55 | Tris-aziridyl phosphine oxide: N,N'-bis-ethylene sebacamide: titanium dioxide (4:1:5). | 2.5 |

A 2/1 weight ratio blend of pyromellitic dianhydride and dodecenyl succinic anhydride was admixed on a stoichiometric basis (1/1 equivalent basis) with a 2/1 weight ratio blend of N,N'-bis-ethylene isosebacamide and N,N'-bis-ethylene sebacamide. Extracted human teeth were prepared by milling an L-shaped section in each specimen. Aluminum strips were bonded to the moist sections with this anhydride adhesive of the above composition for test under tensile shear loading. For purposes of comparison, an ordinary dental acrylate adhesive was also similarly employed.

| Specimen | 1 | 2 | 3 | 4 |
|---|---|---|---|---|
| Wt percent acrylate adhesive | 100 | 80 | 60 | 40 |
| Wt percent anhydride adhesive | 0 | 20 | 40 | 60 |
| Shear tensile, p.s.i | 140 | 400 | 515 | 510 |
| Failure | (1) | (2) | (3) | (3) |

[1] Adhesive.
[2] Cohesive and adhesive.
[3] Tooth broke.

The data in Table V indicates the relative effect on reaction time (i.e. time taken for a one gram sample to become tack-free or to complete reaction, average of three or more samples) of varying ratios of alkylenimine ring acid equivalent.

TABLE V

| Run | A | B | C | D | E | F | G | H |
|---|---|---|---|---|---|---|---|---|
| Wt., gram tris-aziridyl phosphine oxide | 0.30 | 0.40 | 0.50 | 0.54 | 0.60 | 0.70 | 0.75 | 0.80 |
| Wt., gram, chloromaleic anhydride | 0.70 | 0.60 | 0.50 | 0.46 | 0.40 | 0.30 | 0.25 | 0.20 |
| Imine ring equivalent | 0.0039 | 0.0052 | 0.0065 | 0.0070 | 0.0078 | 0.0091 | 0.0098 | 0.0104 |
| Acid equivalent | 0.0106 | 0.0091 | 0.0076 | 0.0070 | 0.0061 | 0.0045 | 0.0038 | 0.0030 |
| Imine ring/acid equivalent | 0.37 | 0.57 | 0.86 | 1.0 | 1.3 | 2.0 | 2.6 | 3.5 |
| Average reaction time, minutes | >4.00 | 1.00 | 0.34 | 0.28 | 0.34 | 0.43 | 0.49 | 0.86 |

Although, as mentioned earlier, various hydroxy containing initiators, including water, alcohols, etc., can be used to activate the reaction of alkylenimine derivative and anhydride, water is most effective, since it produces the acid from the anhydride. Alcohols form partial esters with anhydrides, thus reducing the amount of acid present and causing chain termination.

*Example 56*

The outstanding ability of these curable compositions to adhere to bone has been demonstrated.

A 2/1 weight ratio of pyromellitic dianhydride and dodecenyl succinic anhydride was dispersed in three passes on a paint mill. A second blend of N,N'-ethylene isosebacamide and N,N'-bis-ethylene sebacamide (6/4 weight ratio) was also dispersed by the same technique. Then one part of the anhydride blend was added to 1.2 parts by weight of the alkylenimine derivative blend, with the addition of water in the amount of 5% by weight of the latter. After thorough mixing a hard cured resin was obtained after about 5 minutes.

The above liquid adhesive was successfully used to bond polymethyl methacrylate electrode buttons to the skulls of living rats for brain reaction research. The bone to which the liquid is applied was sponged to remove excess fluid, avoiding complete dryness which would hinder the reaction.

*Example 57*

The curable compositions of this invention has also been found to possess the properties of adhesion and dimensional stability necessary for dental resins and adhesives.

In addition to the uses set forth earlier, these liquid curable compositions can also be employed as impregnating agents for paper, synthetic and natural fibers and textiles, etc. For impregnating the more dense materials and for improving the compatibility of the ingredients, organic solvents, such as ethyl cellosolve, methyl ethyl ketone, butyl acetate, etc., can be included in the anhydrous systems to lower the viscosity or flowability, permit easier penetration of the matrix, and to increase the cure rate. Such thinners and diluents also facilitate coating operations, such as spraying, etc.

Various modifications and alterations in the curable compositions and utility thereof will become apparent to those skilled in the art without departing from the scope of this invention.

I claim:

1. An essentially anhydrous, active hydrogen free, room temperature stable admixture consisting essentially of an organic acid anhydride of a polycarboxylic acid as one reactant and, as the other reactant, from about stoichiometric amount to about 50% excess of an azirane ring containing compound selected from the group consisting of:

(1) a phosphine oxide having, as the sole groups capable of reacting with anhydride, from 2 to 3 radicals of the formula

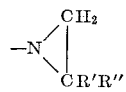

(2) a phosphine sulfide having, as the sole groups capable of reacting with anhydride, from 2 to 3 radicals of the formula

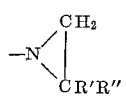

(3) an organic compound containing, as the sole groups capable of reacting with anhydride, from 2 to 3 radicals of the formula

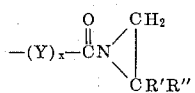

wherein Y is selected from the group consisting of —NH— and oxygen, x is either 0 or 1, and R' and R" are selected from the group consisting of hydrogen and a lower alkyl radical having from 1 to 8 carbon atoms each of said reactants being free of substituents which cause opening of azirane rings at room temperature, said admixture being curable and homogeneous at an elevated temperature below the boiling point of each of the aforesaid compounds.

2. An essentially anhydrous, active hydrogen free, room temperature stable admixture consisting essentially of an organic acid anhydride of a polycarboxylic acid as one reactant and, as the other reactant, from about stoichiometric amount to about 50% excess of a phosphine oxide having from 2 to 3 radicals of the formula

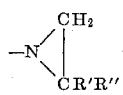

wherein R' and R" are selected from the group consisting of hydrogen and a lower alkyl radical having from 1 to 8 carbon atoms, each of said reactants being free of substituents which cause opening of azirane rings at room temperature, said admixture being curable and homogeneous at an elevated temperature below the boiling point of each of the aforesaid compounds.

3. An essentially anhydrous, active hydrogen free, room temperature stable admixture consisting essentially of an organic acid anhydride of a polycarboxylic acid as one reactant and, as the other reactant, from about stoichiometric amount to about 50% excess of a phosphine sulfide having from 2 to 3 radicals of the formula

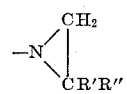

wherein R' and R" are selected from the group consisting of hydrogen and a lower alkyl radical having from 1 to 8 carbon atoms, each of said reactants being free of substituents which cause opening of azirane rings at room temperature, said admixture being curable and homogeneous at an elevated temperature below the boiling point of each of the aforesaid compounds.

4. An essentially anhydrous, active hydrogen free, room temperature stable admixture consisting essentially of an organic acid anhydride of a polycarboxylic acid as one reactant and, as the other reactant, from about stoichiometric amount to about 50% excess of an organic compound containing, as the only groups capable of reacting with anhydride at an elevated temperature, from 2 to 3 radicals of the formula

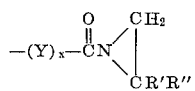

wherein Y is selected from the group consisting of —NH— and oxygen, x is either 0 or 1, and R' and R" are selected from the group consisting of hydrogen and a lower alkyl radical having from 1 to 8 carbon atoms, each of said reactants being free of substituents which cause opening of azirane rings at room temperature, said admixture being curable and homogeneous at an elevated temperature below the boiling point of each of the aforesaid compounds.

5. An essentially anhydrous, active hydrogen free, room temperature stable admixture consisting essentially of an organic acid anhydride of a polycarboxylic acid as one reactant and, as the other reactant, from about stoichiometric amount to about 50% excess of a compound of the formula

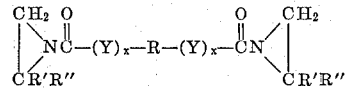

wherein Y is selected from the group consisting of —NH— and oxygen, x is either 0 or 1, R' and R" are selected from the group consisting of hydrogen and a lower alkyl radical having from 1 to 8 carbon atoms, and R has from about 4 to about 40 carbon atoms and is selected from the group consisting of a divalent aliphatic, a divalent aromatic and a divalent alicyclic radical, each of said reactants being free of substituents which cause opening of azirane rings at room temperature, said admixture being curable and homogeneous at an elevated temperature below the boiling point of each of the aforementioned compounds.

6. The admixture of claim 5 in which the admixture is essentially homogeneous at room temperature.

7. The admixture of claim 5 in which the compound of the recited formula is N,N'-bis-ethylene isosebacamide.

8. The admixture of claim 5 in which the compound of the recited formula is N,N'-bis-ethylene sebacamide.

9. The admixture of claim 5 in which the compound of the recited formula is N,N'-bis-ethylene isophthalamide.

10. The admixture of claim 2 in which said phosphine oxide is tris-aziridyl phosphine oxide.

11. The admixture of claim 3 in which said phosphine sulfide is tris-aziridyl phosphine sulfide.

12. An essentially anhydrous, active hydrogen free, room temperature stable admixture consisting essentially of pyromellitic dianhydride and from about stoichiometric amount to about 50% excess of N,N'-bis-ethylene sebacamide.

13. An essentially anhydrous, active hydrogen free, room temperature stable admixture consisting essentially of methyl nadic anhydride and from about stoichiometric amount to about 50% excess of tris-aziridyl phosphine oxide.

14. A curing process which comprises heating to an elevated temperature an essentially anhydrous, active hydrogen free, room temperature stable admixture consisting essentially of an organic acid anhydride of a polycarboxylic acid as one reactant and, as the other reactant, from about stoichiometric amount to about 50% excess of a phosphine oxide having from 2 to 3 radicals of the formula

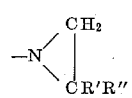

wherein R' and R" are selected from the group consisting of hydrogen and a lower alkyl radical having from 1 to 8 carbon atoms, each of said reactants being free of substituents which cause opening of azirane rings at room temperature, said admixture being curable and homogeneous at an elevated temperature below the boiling point of each of the aforesaid compounds.

15. A curing process which comprises heating to an elevated temperature an essentially anhydrous, active hydrogen free, room temperature stable admixture consisting essentially of an organic acid anhydride of a polycarboxylic acid as one reactant and, as the other reactant, from about stoichiometric amount to about 50% excess of a phosphine sulfide having from 2 to 3 radicals of the formula

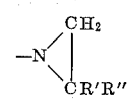

wherein R' and R" are selected from the group consisting of hydrogen and a lower alkyl radical having from 1 to 8 carbon atoms, each of said reactants being free of substituents which cause opening of azirane rings at room temperature, said admixture being curable and homogeneous at an elevated temperature below the boiling point of each of the aforesaid compounds.

16. A curing process which comprises heating to an elevated temperature an essentially anhydrous, active hydrogen free, room temperature stable admixture consisting essentially of an organic acid anhydride of a polycarboxylic acid as one reactant and, as the other reactant, from about stoichiometric amount to about 50% excess of an organic compound containing, as the only groups capable of reacting with anhydride at an elevated temperature, from 2 to 3 radicals of the formula

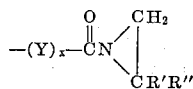

wherein Y is selected from the group consisting of —NH— and oxygen, $x$ is either 0 or 1, and R' and R" are selected from the group consisting of hydrogen and a lower alkyl radical having from 1 to 8 carbon atoms, each of said reactants being free of substituents which cause opening of azirane rings at room temperature, said admixture being curable and homogeneous at an elevated temperature below the boiling point of each of the aforesaid compounds.

References Cited by the Examiner
UNITED STATES PATENTS

| | | | |
|---|---|---|---|
| 2,130,948 | 9/1938 | Carothers | 260—78 |
| 2,915,480 | 12/1959 | Reeves et al. | 260—78.4 |
| 3,115,474 | 12/1963 | Smith | 260—78 |
| 3,115,482 | 12/1963 | Smith | 260—78 |

WILLIAM H. SHORT, *Primary Examiner.*

LOUISE P. QUAST, *Examiner.*

H. D. ANDERSON, *Assistant Examiner.*